United States Patent
Bennett

(10) Patent No.: US 8,199,833 B2
(45) Date of Patent: *Jun. 12, 2012

(54) TIME SHIFT AND TONAL ADJUSTMENT TO SUPPORT VIDEO QUALITY ADAPTATION AND LOST FRAMES

(75) Inventor: James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 961 days.

This patent is subject to a terminal disclaimer.

(21) Appl. No.: 12/197,814

(22) Filed: Aug. 25, 2008

(65) Prior Publication Data

US 2010/0046639 A1     Feb. 25, 2010

(51) Int. Cl.
*H04N 7/12* (2006.01)
*G10L 21/04* (2006.01)

(52) U.S. Cl. .................. 375/240.28; 704/503

(58) Field of Classification Search .......... None
See application file for complete search history.

(56) References Cited

U.S. PATENT DOCUMENTS

| | | | |
|---|---|---|---|
| 5,920,842 A * | 7/1999 | Cooper et al. | 704/503 |
| 2004/0153565 A1* | 8/2004 | Bloch et al. | 709/232 |
| 2006/0075428 A1* | 4/2006 | Farmer et al. | 725/38 |
| 2007/0174880 A1* | 7/2007 | Fite et al. | 725/87 |
| 2008/0288991 A1* | 11/2008 | Smoyer et al. | 725/95 |
| 2009/0125945 A1* | 5/2009 | Lee et al. | 725/46 |
| 2010/0034256 A1* | 2/2010 | Bennett | 375/240.01 |

* cited by examiner

*Primary Examiner* — Clemence Han
(74) *Attorney, Agent, or Firm* — Garlick & Markison

(57) ABSTRACT

A digital electronic device includes a time shifter/tone adapter that eliminates unwanted audio effects at recipient device, that includes stutter and loss of audio synchronization, as a result of video quality adaptation (the video quality adapter varies frame rate, pixel and color resolutions without having a discernable difference in picture quality, that is, drops many frames in every frame set). The tone adaptation involves gradual frequency shifting, that is, gradual up shifting until synchronization with video is obtained (time shifting), then gradual down shifting. The recipient device (or a set top box) may contain a time shifter/tone adapter that eliminates unwanted audio effects at the recipient devices that may include stutter and loss of audio synchronization, as a result of loss of packets in channel.

20 Claims, 11 Drawing Sheets

TIME SHIFT AND TONAL ADJUSTMENT TO SUPPORT VIDEO QUALITY ADAPTATION AND LOST FRAMES

BACKGROUND

1. Technical Field

The present invention relates generally to packet switched infrastructure that supports transmission of video streams; and, more particularly to quality adaptation of video stream transmissions.

2. Related Art

The rapid evolution of the Internet based hardware and software technology has lead to many new applications in recent years. These applications include the delivery of audio and video programming via the Internet to recipient devices in the home, office, and/or public places. Audio and video program transmission include encoding packaging digital audio data and/or digital video data to produce streamed audio and video data, packetizing the encoded audio/video stream using the Internet protocol (or another communication interface standard) and transmitting the data packets to the recipient devices via the Internet backbone, ISPs (the Internet Service Providers), and APs (Access Points), among other devices. Recipient devices typically include personal or laptop computers, televisions, mobile phones, STBs (Set Top Boxes), PDAs (Personal Digital Assistants) and PVRs (Personal Video Recorders), among other devices.

To efficiently use the Internet and device resources such as delivery and storage bandwidth/data transfer consumption, the audio and video streams are compressed during the encoding process prior to being packetized and time stamped. Typical encoding schemes/processes include the MPEG, JPEG, and MP3 families of standards, among others. At a source side (such as the equipment belonging to ISPs who provide these programs), typical operational processes include receiving audio and video programming that is remotely sourced via satellite, fiber optic or the Internet based channels. Other programming may be generated locally, for example, from a local storage device that contains a plurality of DVDs (Digital Video Disks). Then, the audio and/or video programming is encoded, multiplexed, and transmitted to the recipient devices.

The term encoding, in industry, is used very broadly, and the process of such may include one or more of digitization, compression (such as MPEG4 or MP3), time stamping, and packetization. Examples of compression technologies include MPEG4 (for compressing digital video signals), JPEG (for compressing digital pictures), and MP3 (for compressing digital audio signals). Typically, video compression technologies include spatial compression followed by temporal compression. Temporal compression may include the generation of spatially compressed independent frames, followed by the generation of a set of spatially compressed reference (predicted) frames that only carry the difference video information between the independent frame and/or some of the preceding reference frames and current frame and generation of re-referencing (bi-directional predicted) frame that may only carry the difference video information between the independent frame and/or preceding and/or succeeding reference frames and current frame.

At the recipient device, the audio and video packets are decoded and processed as is appropriate. Typically a STB is provided by a satellite or cable program provider to perform decoding and processing. Again, the term decoding may mean several processes to different people, and the process itself may include de-multiplexing, de-packetization, decompression, assembling packets in proper sequential order, digital to analog conversion and then further processing as appropriate to the recipient device. Therefore, at the recipient end, often the processing and buffering capability used to decompress and reassemble the program packets in order becomes a major bottle neck.

Typical problems encountered in delivery of audio and video streams using the Internet Protocol are: (a) limitations in the processing and buffering capability of the recipient devices—such limitations cause problems in the decompression and reassembly of the video stream carrying the programming which results in the recipient device not being able to present programs properly; (b) loss or delay of packets, e.g., IP packets, arriving at the recipient device—this causes the recipient device not to be able to reconstruct video frames in sequential order, for example, resulting in skipping of many frames at a time that may last more than a second; (c) individual loss or delay of video frames in a manner that does not correspond to a loss or delay of corresponding audio data, resulting in a loss of synchronization between audio data; and (d) errors in base video frames, because of spatial compression—an error occurring in a base video frame persists in reference video frames that depend from the base video, causing the error to appear in the video output for a period of time.

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
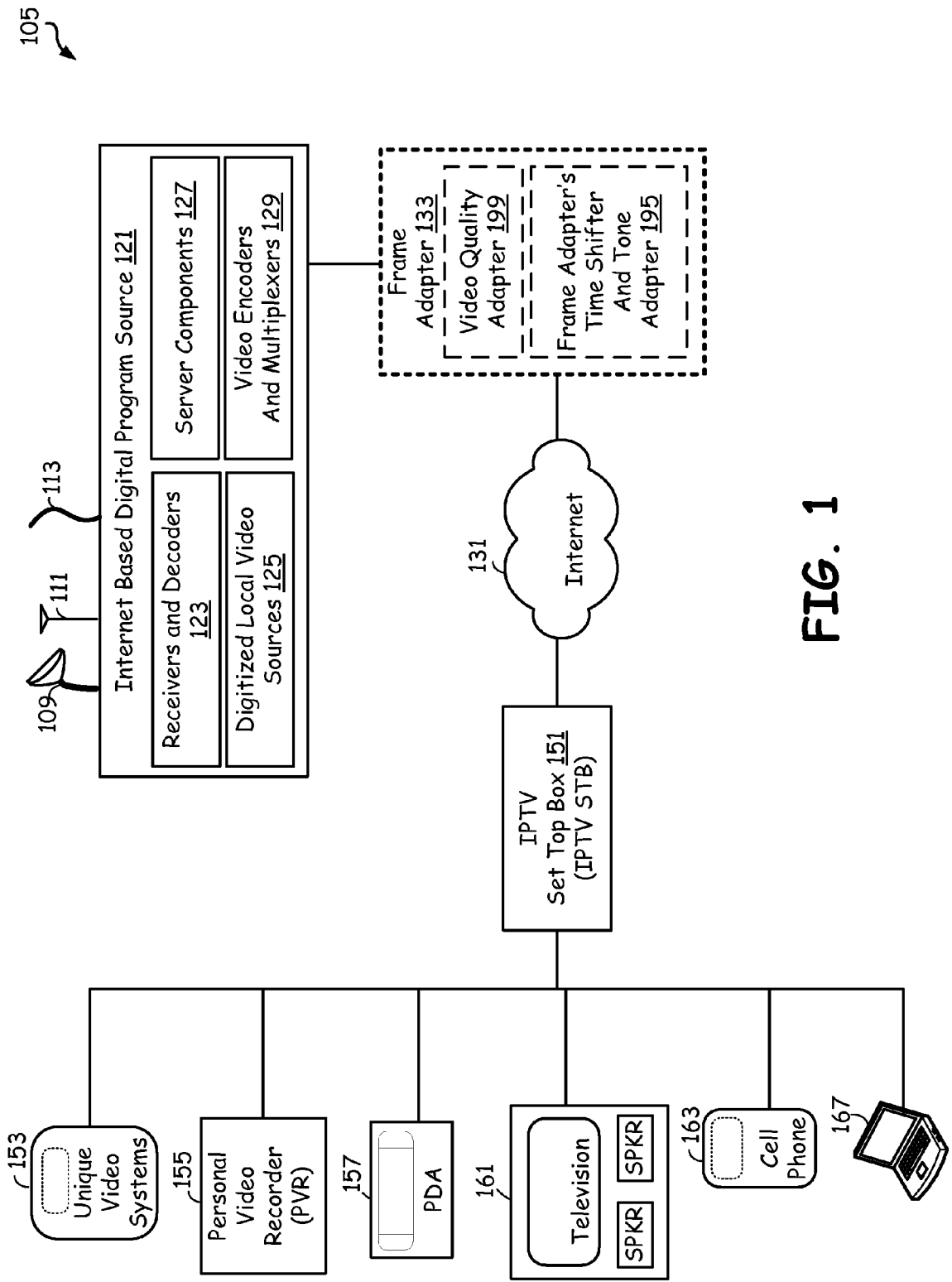
FIG. 1 is a system diagram illustrating an Internet infrastructure containing an Internet based digital program source communicatively coupled to a frame adapter that contains a video quality adapter and frame adapter's time shifter/tone adapter, in turn communicatively coupled to a plurality of recipient devices via the Internet, and optionally a set top box, wherein the frame adapter's time shifter/tone adapter eliminates unwanted audio effects at the recipient devices that include stutter and loss of audio synchronization, as a result of video quality adaptation.

FIG. 1 is a system diagram illustrating an Internet infrastructure 105 containing an Internet based digital program source 121 communicatively coupled at front end with a frame adapter 133, that contains a video quality adapter 199 and frame adapter's time shifter/tone adapter 195, in turn communicatively coupled to a plurality of recipient devices 153, 155, 157, 161, 163 and 167 via the Internet 131, and optionally a set top box 151, wherein the frame adapter's time shifter/tone adapter 195 eliminates unwanted audio effects at the recipient devices 153, 155, 157, 161, 163 and 167 that include stutter and loss of audio synchronization, as a result of video quality adaptation. In specific, the frame adapter's time shifter/tone adapter 195 receives digital video program signals (video packets/video frames) along with digital audio program signals (audio packets) from the video quality adapter 199 and applies some specific modifications and sound effects on the digital audio program signals to compensate for adaptive reductions in frame rate (performed by the video quality adapter 199). Without such modifications and applications of compensative sound effects, the audio reproductions at the recipient device 153, 155, 157, 161, 163, or 167 would produce loss of synchronization, stutters, and abrupt changes in the sound quality during the periods when packets/frames are dropped. Three more embodiments of the present invention are described with reference to FIGS. 2, 3 and 4.

The modifications and applications of compensative sound effects performed by the frame adapter's time shifter/tone adapter 195 include resynchronization and gradual shifts in frequency of the digital audio program signals, during the periods when frames are dropped, to compensate for the adaptive reductions in frame rate, performed by the video quality adapter 199. These modifications and applications of compensative sound effects are performed, by identifying the first and the last of the dropped frames and applying them during these transition periods.

The frame adapter's time shifter/tone adapter 195 initially performs operation of time shifting the digital audio program signals, by eliminating the digital audio program signals that correspond to dropped frames during the adaptive reductions in frame rate. Once the digital audio program signals that correspond to dropped frames are eliminated, the frame adapter's time shifter/tone adapter 195 reassembles the rest of the digital audio program signals. Then, the frame adapter's time shifter/tone adapter 195 resynchronizes the remaining digital audio program signals with that of digital video program signals, for which adaptive reductions in frame rate are already performed by the video quality adapter 199.

Once the time shifting operation is completed, the frame adapter's time shifter/tone adapter 195 performs compensative sound effects, which removes stutter and any other abrupt changes in the sound, the period of which corresponds to that of dropped video frames. Initially, these operations involve identifying the first and last frames of the dropped frames, in any frame set interval, for each of the dropped sets. The video quality adapter 199, reassembles the rest of the frames in the digital video program signals, after performing the adaptive reductions in frame rate (i.e., after dropping few frames) and notifies the identification of the first and last of dropped frames, to the frame adapter's time shifter/tone adapter 195. Then, the frame adapter's time shifter/tone adapter 195 gradually shifts frequency upwards and then downwards in such a way as to not have any discernable unwanted effects in audio reproduction at the recipient device 153, 155, 157, 161, 163 or 167.

The gradual upward frequency shift is performed during a period of few frames, starting at few frames before first dropped frame and ending at the first dropped frame. Similarly, the gradual downward frequency shift is performed for a time period starting at last dropped frame and ending at few frames after the last dropped frame. The gradual frequency shift itself consists of shifting entire frequency set in upward or downward directions, during the above mentioned periods. Once, these operations upon the digital audio program signals are performed, the frame adapter's time shifter/tone adapter 195 delivers these digital video and audio program signals back to the frame adapter 133 for further processing.

The video quality adapter 199 performs functionalities of the adaptive reductions in frame rate based upon minimum number of frames per second required for not having a discernable difference in picture quality in the recipient device 153, 155, 157, 161, 163 or 167, to save internet resources and reduce the recipient device 153, 155, 157, 161, 163 or 167 processing and buffering loads. In addition, the video quality adapter 199 also performs functionalities of reductions in pixel and color resolutions based upon recipient device 153, 155, 157, 161, 163 or 167 configurations, for not having any discernable difference in picture quality at the recipient device 153, 155, 157, 161, 163 or 167, again, to save internet resources and reduce the recipient device 153, 155, 157, 161, 163 or 167 processing and buffering loads.

Above mentioned video quality adapter's 199 functionalities are based upon a frame set backdrop. The frame set backdrop is nothing but a quantitative representation, given to the frame set, that determines minimum number of frames per second, minimum pixel and color resolutions required for not having a discernable difference in picture quality (as observed by an average user). The video quality adapter 199 also receives feedback from the recipient device 153, 155, 157, 161, 163 or 167, containing their configuration information, and utilizes this information to adapt video quality.

For example, the frame set backdrop for a set of frames that contain fast action scenes would be very high because of quick changes between frames and as a result minimum number of frames are retained in this case. The pixel and color resolution may also be reduced during the periods when frame set backdrop is high, without causing any discernable deterioration in quality of moving pictures in a video. In contrast, for a dialogue containing set of frames or static picture containing set of frames, the frame set backdrop would be low. As a result, the number of frames dropped in a frame set would be minimum and pixel and color resolutions would be fairly high.

Before above mentioned processing of video quality by the video quality adapter 199, the frame adapter 133 processes the Internet protocol program packets by de-multiplexing audio, video and data signals, de-packetizing them and then, individually decompress the audio, video and data signals to extract raw digital audio, video and data program signals. The compression technology may vary, depending upon the Internet based digital signal source 121, but typically, MPEG4 compression technology is employed on video signals, where as MP3 compression technology may be employed on audio signals. Once raw digital audio, video and data program signals are extracted, the digital video program signals are sent to video quality adapter 199, which in turn varies frame rate, pixel and color resolutions based upon the frame set backdrop and recipient device 153, 155, 157, 161, 163 or 167 video configurations such as screen size and aspect ratio, as mentioned in above paragraphs. Once the video quality adaptations are completed, the digital audio and video program signals are sent to the frame adapter's time shifter/tone adapter 195 for the above mentioned modifications and applications of compensative sound effects.

A Set Top Box (STB) 151, if provided by the ISPs and if not already incorporated into the recipient device 153, 155, 157, 161, 163 or 167, receives these internet protocol program packets (containing digital video program signals, whose quality is adapted, adaptively compressed; also containing adaptively compressed, time shifted and tone adapted digital audio program signals, and digital data contents) and decodes them by de-multiplexing, de-packetizing, decompressing and converting back to their original analog audio, video and data signals (and if need be, modulating on a RF—Radio Frequency—carrier) and deliver them to the recipient device 153, 155, 157, 161, 163 or 167.

The illustration 105 also depicts some of the typical modern recipient devices such as unique video systems 153 (which may include video devices such as projector), personal video recorder 155, PDA (Personal Digital Assistant) 157, television 161, cell phone 163 and personal or laptop computer 167, communicatively coupled to the Internet based digital program source 121 via the STB 151 (optionally), the Internet 131 and frame adapter 133. The frame adapter 133 itself, along with built-in video quality adapter 199 and frame adapter's time shifter and tone adapter 195, is located at the premises of the ISP, where the Internet based digital program source 121 is also located. In addition, the Internet based digital program source 121 may also contain a satellite dish 109, an antenna 111 (to receive locally broadcast programs, for example) and cable or fiber optic connections 113, to communicate with external program sources.

For example, a cell phone 163 (equipped with WLAN—Wireless Local Area Network—reception capabilities) may receive IP program packets via WLAN modem. The frame adapter 133 determines the video quality adaptation parameters along with compression technology and corresponding parameters by receiving the cell phone 163 video and audio configurations. Then, the video quality adapter 199 dynamically varies the frame rate, color and pixel resolutions on the basis of the frame set backdrop, audio and video configurations of the cell phone 163. During these processes of video quality adaptation, the frame adapter's time shifter/tone adapter 195 performs time shifting and tone adaptation on the digital audio program signals. The frame adapter's time shifter/tone adapter 195 performs these tasks by receiving digital video program signals along with digital audio program signals from the video quality adapter 199 and then applying the above mentioned modifications and sound effects on the digital audio program signals to compensate for the adaptive reductions in frame rate. As a result, the digital video program signals received by the cell phone 163 contains bare minimum bit transfer rate and thus easily processed and displayed on the screen without having any discernable deterioration in video or audio reproductions, even when many frames are dropped.

Figure 2:
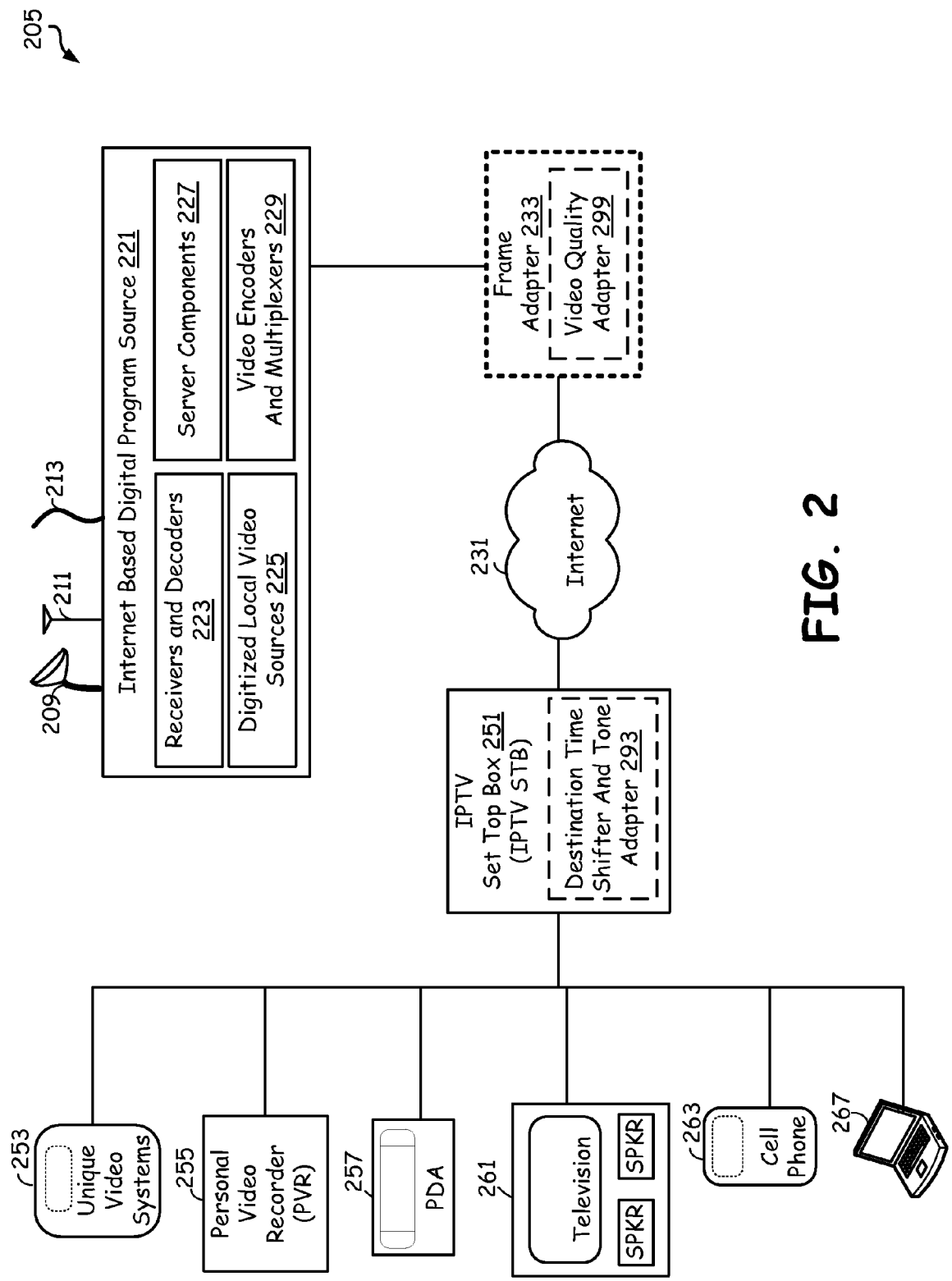
FIG. 2 is a system diagram illustrating an Internet infrastructure containing an Internet based digital program source communicatively coupled to with a frame adapter that contains a video quality adapter, in turn communicatively coupled to a plurality of recipient devices or set top box containing a destination time shifter/tone adapter via the Internet, wherein the destination time shifter/tone adapter eliminates unwanted audio effects at the recipient devices that include stutter and loss of audio synchronization, as a result of video quality adaptation or loss of packets in channel.

FIG. 2 is a system diagram illustrating an Internet infrastructure 205 containing an Internet based digital program source 221 communicatively coupled at front end with a frame adapter 233, that contains a video quality adapter 299, in turn communicatively coupled to a plurality of recipient devices 253, 255, 257, 261, 263 and 267 or set top box 251 containing a destination time shifter/tone adapter 293 via the Internet 231, wherein the destination time shifter/tone adapter 293 eliminates unwanted audio effects at the recipient devices 253, 255, 257, 261, 263 and 267, that includes stutter and loss of audio synchronization, as a result of video quality adaptation or loss of packets in channel. Specifically, the destination time shifter/tone adapter 293 receives digital video program signals along with digital audio program signals from the set top box 251 and applies some specific modifications and sound effects on the digital audio program signals to compensate for the adaptive reductions in frame rate (performed by the video quality adapter 299) or loss of frames during transmission. This illustration shows a second embodiment of the present invention where time shifter and tone adapter functionalities are incorporated at the set top box 251, rather than at the frame adapter 233.

The modifications and applications of compensative sound effects performed by the destination time shifter/tone adapter 293 involve resynchronization and gradual shifts in frequency of the digital audio program signals, during the transition period where frames are dropped or lost. These modifications and applications of compensative sound effects are performed, by identifying the first and the last of the dropped or lost frames and the set top box 251 performs this functionality and informs the destination time shifter/tone adapter 293. The destination time shifter/tone adapter 293 initially performs operation of time shifting the digital audio program signals, by eliminating the digital audio program signals that correspond to dropped frames during the adaptive reductions in frame rate or lost frames during transmission, then, resynchronizes the remaining digital audio program signals with that of digital video program signals.

Once the time shifting operation is completed, the destination time shifter/tone adapter 293 performs compensative sound effects, by gradually shifting frequency upwards and then downwards in such a way as to not have any discernable unwanted effects in audio reproduction at the recipient device 253, 255, 257, 261, 263 or 267. The gradual upward frequency shift is performed during a period of few frames, starting at few frames before first dropped or lost frame and ending at the first dropped or lost frame. Similarly, the gradual downward frequency shift is performed for a time period starting at last dropped or lost frame and ending at few frames after the last dropped or lost frame. The gradual frequency shift itself consists of shifting entire frequency set in upward or downward directions, during the above mentioned periods. Once, these operations upon the digital audio program signals are performed, the destination time shifter/tone adapter 293 delivers these digital video and audio program signals back to the set top box 251 for further processing.

The illustration 205 depicts typical recipient devices such as unique video systems 253, personal video recorder 255, PDA (Personal Digital Assistant) 257, television 261, cell phone 263, and personal or laptop computer 267, communicatively coupled to the Internet based digital program source 221 and the Internet 231. The illustration 205 also depicts various components of the Internet based digital program source 221 that include receivers and decoders 223, digitized local video sources 225, server components 227, communication tools to receive external programs from their source such as a satellite dish 209, an antenna 211 and cable or fiber optic connections 213, and encoders and multiplexers 229.

The video quality adapter 299 performs functionalities of the adaptive reductions in frame rate based upon minimum number of frames per second required for not having a discernable difference in picture quality in the recipient device 253, 255, 257, 261, 263 or 267, to save internet resources and reduce the recipient device 253, 255, 257, 261, 263 or 267 processing and buffering loads. In addition, the video quality adapter 299 also performs functionalities of reductions in pixel and color resolutions based upon recipient device 253, 255, 257, 261, 263 or 267 configurations, for not having any discernable difference in picture quality at the recipient device 253, 255, 257, 261, 263 or 267.

For example, a television 261 may be connected to the IPTV STB 251, to receive digital video programs from the Internet based digital program source 221. The frame adapter 233 determines the video quality adaptation parameters along with compression technology and corresponding parameters by receiving the television 261 video and audio configurations, via the IPTV STB 251. Then, the video quality adapter 299 dynamically varies the frame rate, color and pixel resolutions on the basis of the frame set backdrop, audio and video configurations of the television 261. During the reception, the IPTV STB 251 processes the IPTV packets by de-multiplexing, decoding to extract digital audio, video and data program signals. The IPTV STB 251 also determines first and last of the dropped frames during video quality adaptation or first and last lost frames that are lost during transmission. Then, the digital audio and video signals are sent to the destination time shifter/tone adapter 293 to perform time shifting and tone adaptation on the digital audio program signals. The destination time shifter/tone adapter 293 performs these tasks by receiving digital video program signals along with digital audio program signals from the IPTV STB 251 and then applying the above mentioned modifications and sound effects on the digital audio program signals to compensate for the adaptive reductions in frame rate. As a result, the digital video program signals received by the television 261 contains bare minimum bit transfer rate and thus easily processed and displayed on the screen without having any discernable deterioration in video or audio reproductions, even when many frames are dropped or lost.

Figure 3:
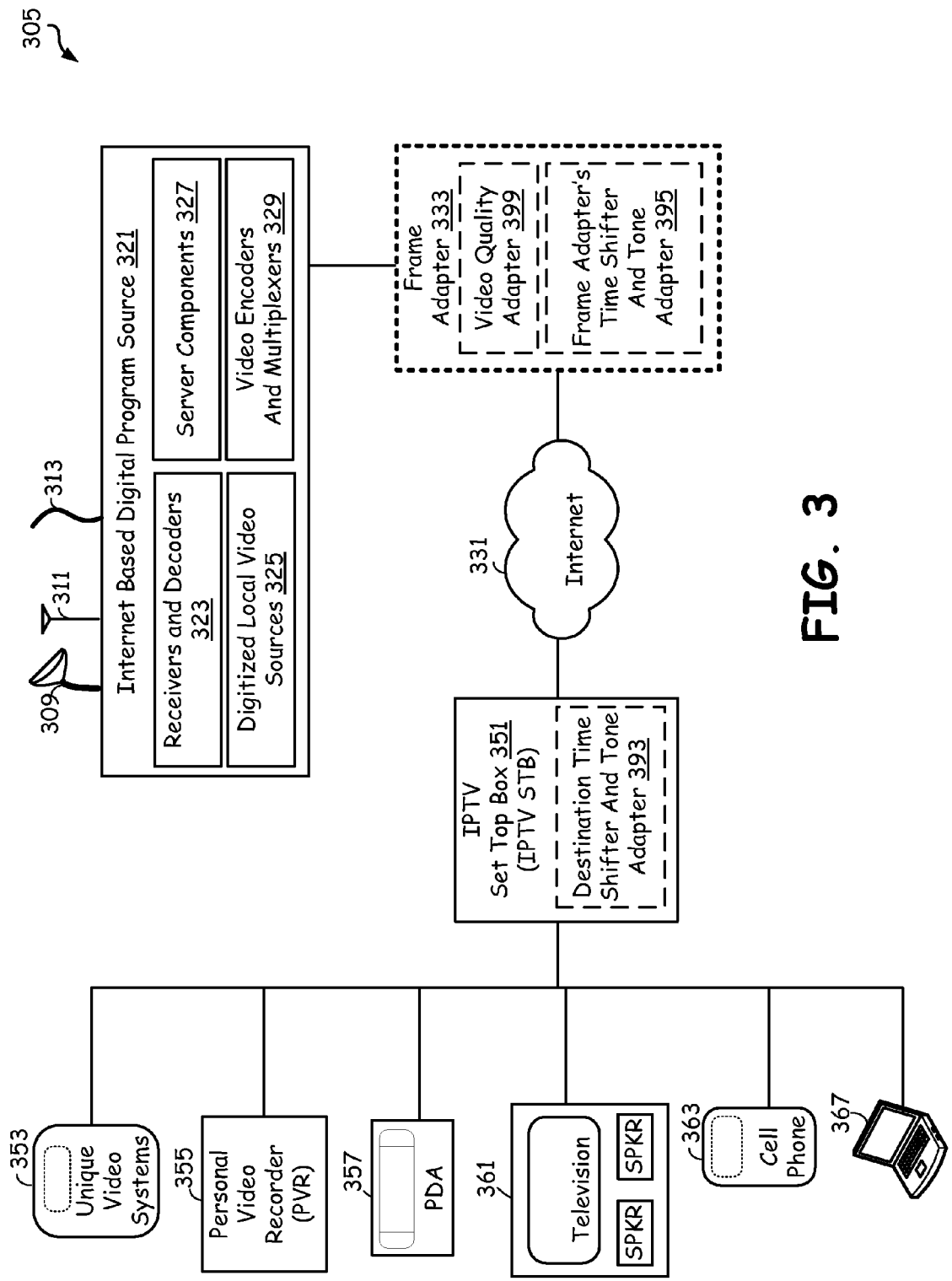
FIG. 3 is a system diagram illustrating an Internet infrastructure containing an Internet based digital program source communicatively coupled to a frame adapter that contains a video quality adapter and frame adapter's time shifter/tone adapter, in turn communicatively coupled to a plurality of recipient devices or set top box containing a destination time shifter/tone adapter via the Internet, wherein the frame adapter's time shifter/tone adapter by interaction with the destination time shifter/tone adapter eliminates unwanted audio effects at the recipient devices that include stutter and loss of audio synchronization, as a result of video quality adaptation and loss of packets.

FIG. 3 is a system diagram illustrating an Internet infrastructure 305 containing an Internet based digital program source 321 communicatively coupled at front end with a frame adapter 333, that contains a video quality adapter 399 and frame adapter's time shifter/tone adapter 395, in turn communicatively coupled to a plurality of recipient devices 353, 355, 357, 361, 363 and 367 or set top box 351 containing a destination time shifter/tone adapter 393 via the Internet 331, wherein the frame adapter's time shifter/tone adapter 395 by interaction with the destination time shifter/tone adapter 395 eliminates unwanted audio effects at the recipient devices 353, 355, 357, 361, 363 and 367, that includes stutter and loss of audio synchronization, as a result of video quality adaptation and loss of packets. In specific, the frame adapter's time shifter/tone adapter 395 receives digital video program signals along with digital audio program signals from the video quality adapter 399 and applies modifications and sound effects on the digital audio program signals to compensate for the adaptive reductions in frame rate (performed by the video quality adapter 399). The destination time shifter/tone adapter 393, in turn, receives digital video program signals along with digital audio program signals from the set top box 351 and applies modifications and sound effects on the digital audio program signals to compensate for the loss of frames during transmission. This illustration shows a third embodiment of the present invention where time shifter and tone adapter functionalities are incorporated both at the frame adapter 333 and set top box 351.

Though, the frame adapter's time shifter/tone adapter 395 and destination time shifter/tone adapter 393 work by interacting with one another, as far as the adaptive reductions in frame rates are concerned, the time shifting and tone adaptation functionalities may not be repeated at both modules 395 and 393. The time shifting and tone adaptation functionalities of modules 395 and 393 are same as those described with reference to FIGS. 1 and 2, respectively. That is, time shifting involves elimination of digital audio program signals that correspond to dropped frames during the adaptive reductions in frame rate and resynchronization. The tone adaptation functionality involves gradual upward frequency shift during a period of few frames, starting at few frames before first dropped frame and ending at the first dropped frame, followed by gradual downward frequency shift for a time period starting at last dropped frame and ending at few frames after the last dropped frame. In case of the destination time shifter/tone adapter 393, the processes are applicable to the lost frames as well.

The illustration 305 depicts typical recipient devices such as unique video systems 353, personal video recorder 355, PDA (Personal Digital Assistant) 357, television 361, cell phone 363, and personal or laptop computer 367, communicatively coupled to the Internet based digital program source 321 and the Internet 331. The illustration 305 also depicts various components of the Internet based digital program source 321 that include receivers and decoders 323, digitized local video sources 325, server components 327, communication tools to receive external programs from their source such as a satellite dish 309, an antenna 311 and cable or fiber optic connections 313, and encoders and multiplexers 329.

Figure 4:
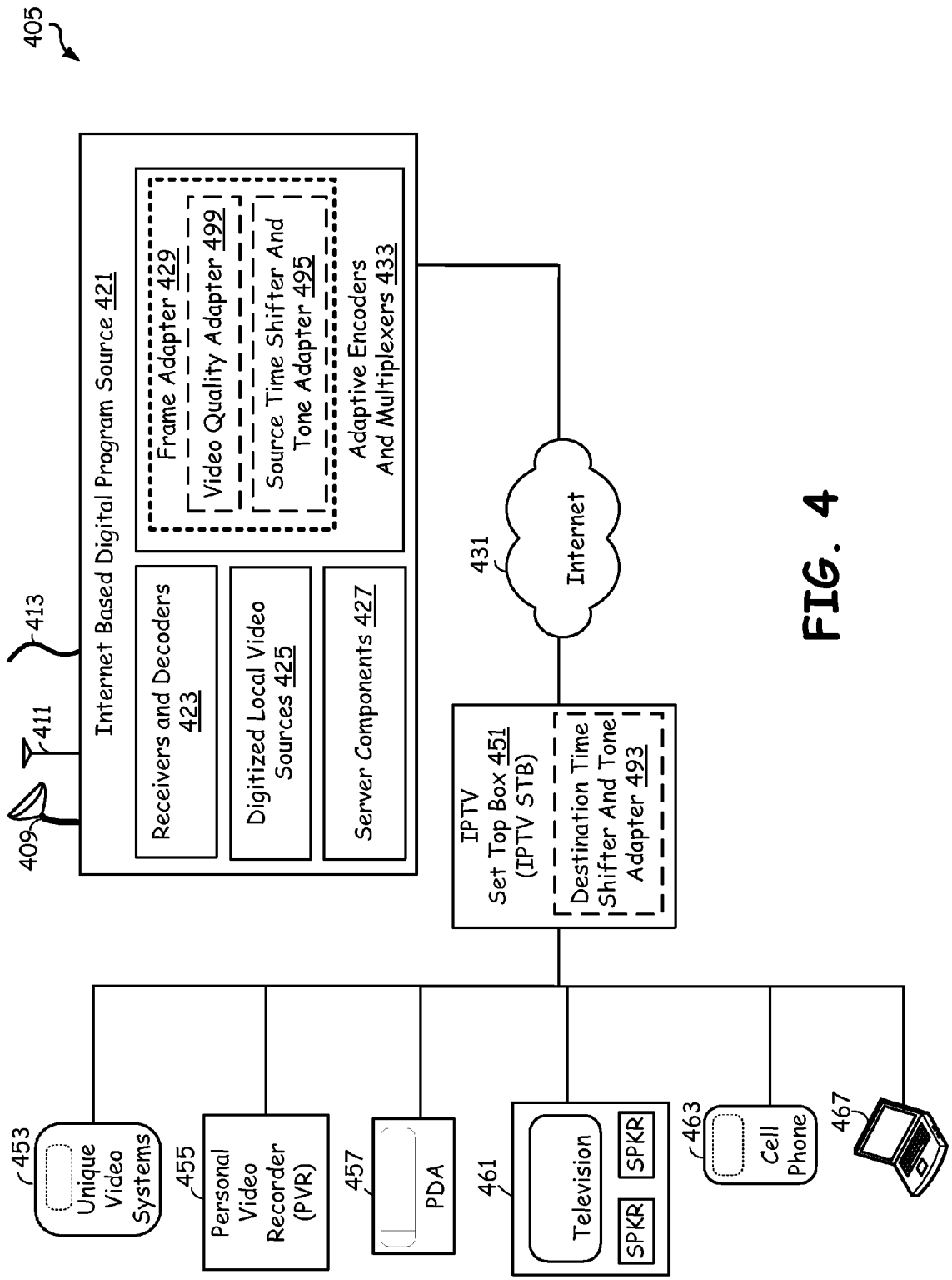
FIG. 4 is a system diagram illustrating an Internet infrastructure containing an Internet based digital program source with adaptive encoders and multiplexers that contains a video quality adapter and source time shifter/tone adapter communicatively coupled to a plurality of recipient devices or set top box containing a destination time shifter/tone adapter via the Internet, wherein the source time shifter/tone adapter by interaction with the destination time shifter/tone adapter eliminates unwanted audio effects at the recipient devices that include stutter and loss of audio synchronization, as a result of video quality adaptation and loss of packets.

FIG. 4 is a system diagram illustrating an Internet infrastructure 405 containing an Internet based digital program source 421, with modified encoders and multiplexers 433 that contains a video quality adapter 499 and source time shifter/tone adapter 495, communicatively coupled to a plurality of recipient devices 453, 455, 457, 461, 463 and 467 or set top box 451 containing a destination time shifter/tone adapter 493 via the Internet 431, wherein the source time shifter/tone adapter 495 by interaction with the destination time shifter/tone adapter 493 eliminates unwanted audio effects at the recipient devices 453, 455, 457, 461, 463 and 467, that includes stutter and loss of audio synchronization, as a result of video quality adaptation and loss of packets. The illustration 405 is a fourth embodiment of the present invention, wherein the time shifter and tone adapter functionalities are incorporated both at the adaptive encoders and multiplexers 433 and set top box 451. The adaptive encoders and multiplexers 433 containing the video quality adapter 499 and source time shifter/tone adapter 495, (optionally, with a built in transcoder), is built into the Internet based digital program source 421 itself, thus modifying the existing infrastructure.

The illustration 405 depicts typical recipient devices such as unique video systems 453, personal video recorder 455, PDA (Personal Digital Assistant) 457, television 461, cell phone 463, and personal or laptop computer 467, communicatively coupled to the Internet based digital program source 421 and the Internet 431. The illustration 405 also depicts various components of the Internet based digital program source 421 that include receivers and decoders 423, digitized local video sources 425, server components 427, communication tools to receive external programs from their source such as a satellite dish 409, an antenna 411 and cable or fiber optic connections 413, and adaptive encoders and multiplexers 433.

The adaptive encoders and multiplexers 433 receive digital audio, video and data program signals from digitized local video source 425 or receivers and decoders 423 (that is, from an external program source). Optionally, the adaptive encoders and multiplexers 433 transcode the digital audio, video and data program signals to optimally suit the requirements of the recipient device 453, 455, 457, 461, 463 or 467. Then, the video quality adapter 499 (built in to the adaptive encoders and multiplexers 433) varies frame rate, pixel and color resolutions in accordance with a frame set backdrop and feedback control data received from the recipient device 453, 455, 457, 461, 463 or 467, such that minimum number of frames per second and minimum pixel and color resolutions are retained within a set of frames, so as not to have a discernable difference in picture quality.

Then, the adaptive encoders and multiplexers 433 receive feedback control data containing recipient device specific 453, 455, 457, 461, 463 or 467 configuration data and adaptively encodes the transcoded and quality adapted video signals, along with raw or transcoded audio and data signals. The encoding process may involve adaptive compression, packetizing and multiplexing before delivering them to the individual recipient device such as 453, 455, 457, 461, 463 or 467. The video compression employed by the adaptive encoders and multiplexers 433 may take form of any of the available standards of compression such as MPEG4, while audio compression may involve MP3 technology. The source time shifter/tone adapter 495 receives digital video program signals along with digital audio program signals from the video quality adapter 495 and applies some specific modifications and sound effects on the digital audio program signals to compensate for the adaptive reductions in frame rate (performed by the video quality adapter 499).

In addition, the destination time shifter/tone adapter 493 receives digital video program signals along with digital audio program signals from the set top box 451 and applies some specific modifications and sound effects on the digital audio program signals to compensate for the adaptive reductions in frame rate (performed by the video quality adapter 499) or loss of frames during transmission. Though, the source time shifter/tone adapter 495 and destination time shifter/tone adapter 493 work by interacting with one another, as far as the adaptive reductions in frame rates are concerned, the time shifting and tone adaptation functionalities may not be repeated at both modules 495 and 493. The time shifting functionality involves elimination of digital audio program signals that correspond to dropped frames during the adaptive reductions in frame rate or lost frames at the set top box 451 and resynchronization. The tone adaptation functionality involves gradual upward frequency shift during a period of few frames, starting at few frames before first dropped or lost frame and ending at the first dropped or lost frame, followed by gradual downward frequency shift for a time period starting at last dropped or lost frame and ending at few frames after the last dropped or lost frame.

Figure 5:
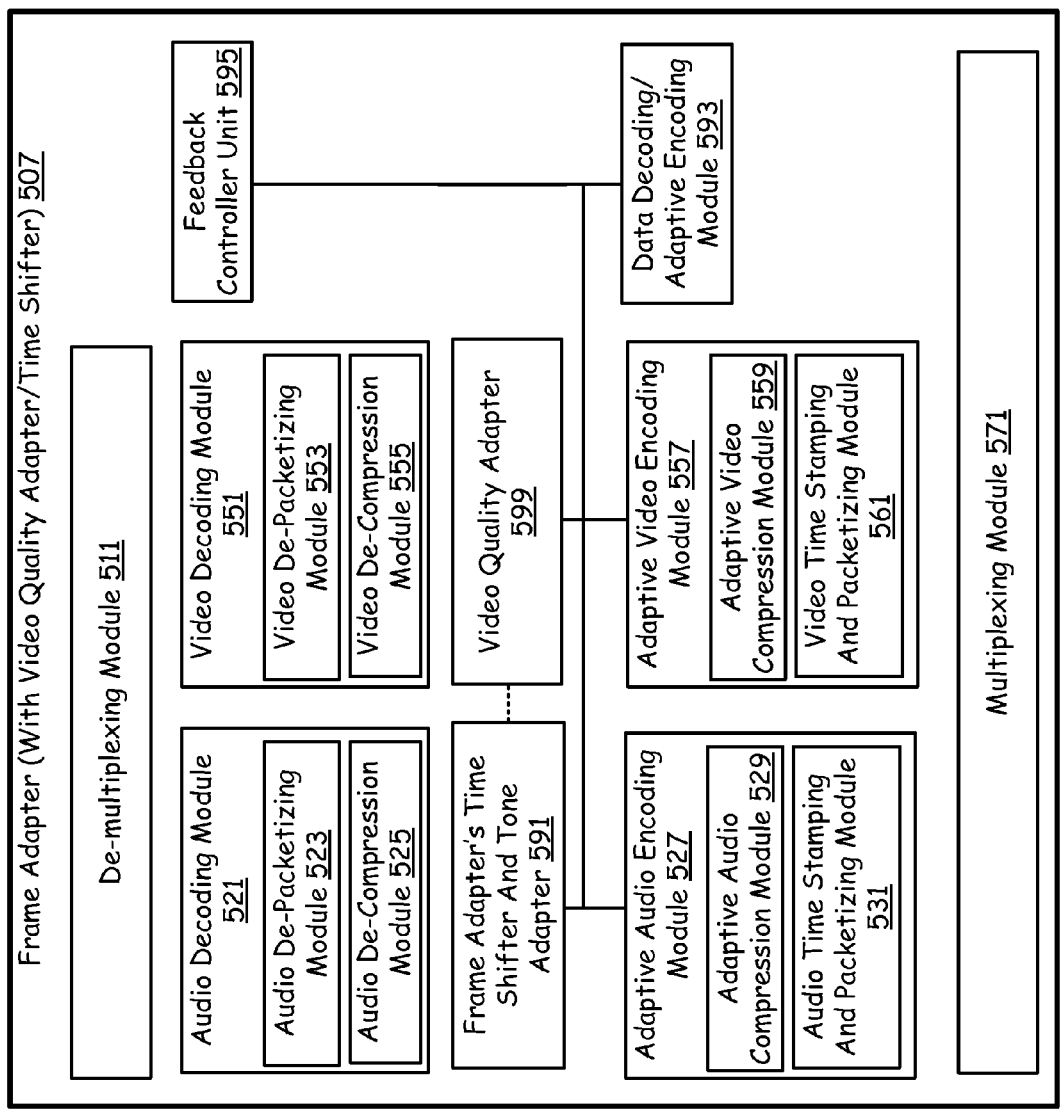
FIG. 5 is a schematic block diagram illustrating components of a frame adapter containing video quality adapter and time shifter/tone adapter constructed in accordance with the embodiments of FIG. 1 and/or FIG. 3 of the present invention.

FIG. 5 is a schematic block diagram illustrating components of the frame adapter containing video quality adapter and time shifter/tone adapter 507 constructed in accordance with the embodiments of FIG. 1 and FIG. 3 of the present invention. The frame adapter containing video quality adapter and time shifter/tone adapter 507 is incorporated at front end of the Internet based digital program source (121 of FIG. 1 or 321 of FIG. 3) and contains a plurality of modules to de-multiplex, decode, adapt video quality, time shift and tone adapt audio signals, and re-encode audio, video and data signals embedded in the IP program packets received from the Internet based digital program source.

The plurality of modules, at the receiving end of the frame adapter containing video quality adapter and time shifter/tone adapter 507, include a de-multiplexing module 511. The de-multiplexing module 511 separates audio, video and data IP program packets from the incoming IP program signals and delivers them to corresponding audio decoding module 521, video decoding module 551 and data decoding/adaptive encoding module 593.

The audio decoding module 521 contains audio de-packetizing module 523 and audio decompression module 525. The audio de-packetizing module 523 removes IP protocol information from the audio IP packets, extracts and delivers compressed audio signals (for example, using MP3 compression format), to the audio decompression module 525. The audio decompression module 525 decompresses the incoming compressed audio signals and extracts the raw audio signal in a standard format.

The raw audio signal is delivered to a frame adapter's time shifter and tone adapter 591, which in turn applies modifications and compensative sound effects on the raw audio signals to compensate for the adaptive reductions in frame rate (performed by video quality adapter 599). The time shifting involves elimination of digital audio program signals that correspond to dropped frames during the adaptive reductions in frame rate and resynchronization. The tone adaptation functionality involves gradual upward frequency shift during a period of few frames, starting at few frames before first dropped frame and ending at the first dropped frame, followed by gradual downward frequency shift for a time period starting at last dropped frame and ending at few frames after the last dropped frame.

Then, the time shifted and tone adapted audio signal is delivered to an adaptive audio encoding module 527, which in turn contains an adaptive audio compression module 529 and audio time stamping and packetizing module 531. The adaptive audio compression module 529 compresses the time shifted and tone adapted audio signal in an optimal and adaptive manner. The feedback control data for determining optimum and adaptive compression is obtained from a feedback control unit 595. Then, the audio time stamping and packetizing module 531 inserts IP protocols information and time stamp on the incoming compressed audio stream to convert the compressed audio signals to IP audio program packets and delivers them to a multiplexing module 571.

Similarly, the video decoding module 551 contains video de-packetizing module 553 and video decompression module 555, which in turn remove IP protocol information from the audio IP packets and extract compressed video signals (for example, using MPEG4 compression format), and then decompress to extract the raw video signal in a standard format, respectively. The video quality adapter's 599 functionality involves varying frame rate, pixel and color resolutions in response to a frame set backdrop, determined based upon minimum number of frames per second and minimum pixel and color resolutions required, for a set of frames, for not having a discernable difference in picture quality. In addition, the video quality adapter 599 also utilizes feedback control data received from the recipient device to adapt video quality, by varying the frame rate, pixel and color resolutions.

Then, an adaptive video compression module 559 and a video time stamping and packetizing module 561 contained in adaptive video encoding module 557, respectively, compress the video quality adapted signals in an optimal and adaptive manner and then insert IP protocol information and time stamp on the incoming compressed video stream to convert the compressed video signals to IP video program packets and deliver them to the multiplexing module 571. The feedback control data for determining optimum number of referencing and re-referencing frames within a frame set (that is, adaptive and optimal compression) is obtained from the feedback control unit 595. In addition, the data decoding/adaptive encoding module 593 decodes and then adaptively encodes the data stream in an analogous fashion to that of audio and video decoding and adaptive encoding process, based upon feedback control data from the feedback control unit 595.

Figure 6:
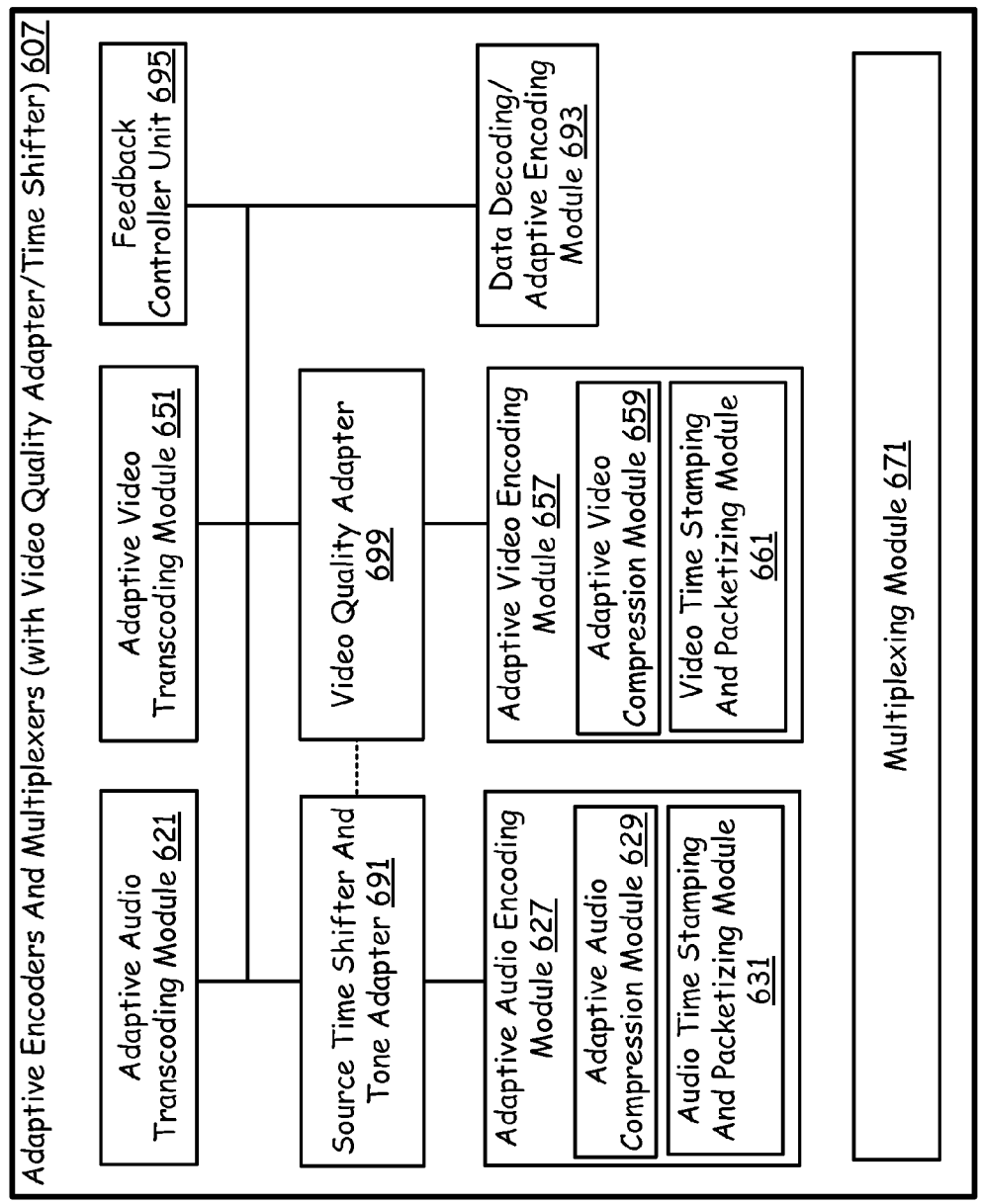
FIG. 6 is a schematic block diagram illustrating components of the adaptive encoder and multiplexer containing a video quality adapter and time shifter/tone adapter constructed in accordance with the embodiment of FIG. 4 of the present invention.

FIG. 6 is a schematic block diagram illustrating components of the adaptive encoders and multiplexers containing a video quality adapter and time shifter/tone adapter 607 constructed in accordance with the embodiment of FIG. 4 of the present invention. The adaptive encoders and multiplexers containing a video quality adapter and time shifter/tone adapter 607 is incorporated into the Internet based digital program source (421 of FIG. 4) and contains a plurality of modules to adaptively and optimally transcode, adapt video quality, time shift and tone adapt audio signals, and encode digital program signals, that are received from an external source (or a local program source).

An adaptive audio transcoding module 621 contained in the adaptive encoders and multiplexers 607 transcodes adaptively the raw audio signal obtained from a local program source. The feedback control data for determining optimum and adaptive transcoding is obtained from a feedback control unit 695. The parameters for optimum audio transcoding may include bandwidth required for a recipient device along with mono, stereo and surround sound capabilities. The raw audio signal is delivered to a source time shifter and tone adapter 691, which in turn applies modifications and compensative sound effects on the raw audio signals to compensate for the adaptive reductions in frame rate (performed by video quality adapter 699).

The time shifting involves elimination of digital audio program signals that correspond to dropped frames during the adaptive reductions in frame rate and resynchronization and the tone adaptation functionality involves gradual upward frequency shift during a period of few frames, starting at few frames before first dropped frame and ending at the first dropped frame, followed by gradual downward frequency shift for a time period starting at last dropped frame and ending at few frames after the last dropped frame.

Then, an adaptive audio compression module 629 and audio time stamping and packetizing module 631 contained in an adaptive audio encoding module 627 compress the transcoded, time shifted and tone adapted audio signals in an optimal and adaptive manner and then, insert IP protocols and time stamp on the transcoded and compressed audio stream to convert to IP audio program packets and deliver them to a multiplexing module 671. The feedback control data for determining optimum and adaptive compression is obtained from the feedback control unit 695.

Similarly, an adaptive video transcoding module 651 contained in the adaptive encoders and multiplexers 607 transcodes adaptively the raw video signal obtained from a local digital program source, the feedback control data for which is obtained from the feedback control unit 695. The parameters for optimum video transcoding may include size and aspect ratio of the recipient device along with processing and buffering capabilities. Then, the video quality adapter 699 varies frame rate, pixel and color resolutions in accordance with a frame set backdrop (determined based upon minimum number of frames per second and minimum pixel and color resolutions required, for a set of frames, for not having a discernable difference in picture quality) and feedback control data. The feedback control data is received from the recipient device via the feedback control unit 695.

An adaptive video encoding module 657 in turn contains an adaptive video compression module 659 and video time stamping and packetizing module 661, respectively, which compress the transcoded and quality adapted video signal in an optimal and adaptive manner and then insert IP protocols and time stamp on the incoming transcoded and compressed video stream to convert to IP video program packets and deliver them to the multiplexing module 671. The feedback control data for determining optimum number of referencing and re-referencing frames within a frame set (that is, adaptive and optimal compression) is obtained from the feedback control unit 695, which in turn is received from the respective recipient video device.

The data decoding/adaptive encoding module 693 decodes and then adaptively encodes the data stream in an analogous fashion to that of audio and video decoding and adaptive encoding process, based upon feedback control data from the feedback control unit 695. In addition, if the adaptive encoders and multiplexers 607 receives a plurality of video programs to be encoded adaptively, packetized and multiplexed (such as a plurality television channels delivered simultaneously), then the multiplexing module 671 may have appropriate circuitry to multiplex the plurality of video programs, in addition to multiplexing audio, video and data IP program packets within each of these video programs.

Figure 7:
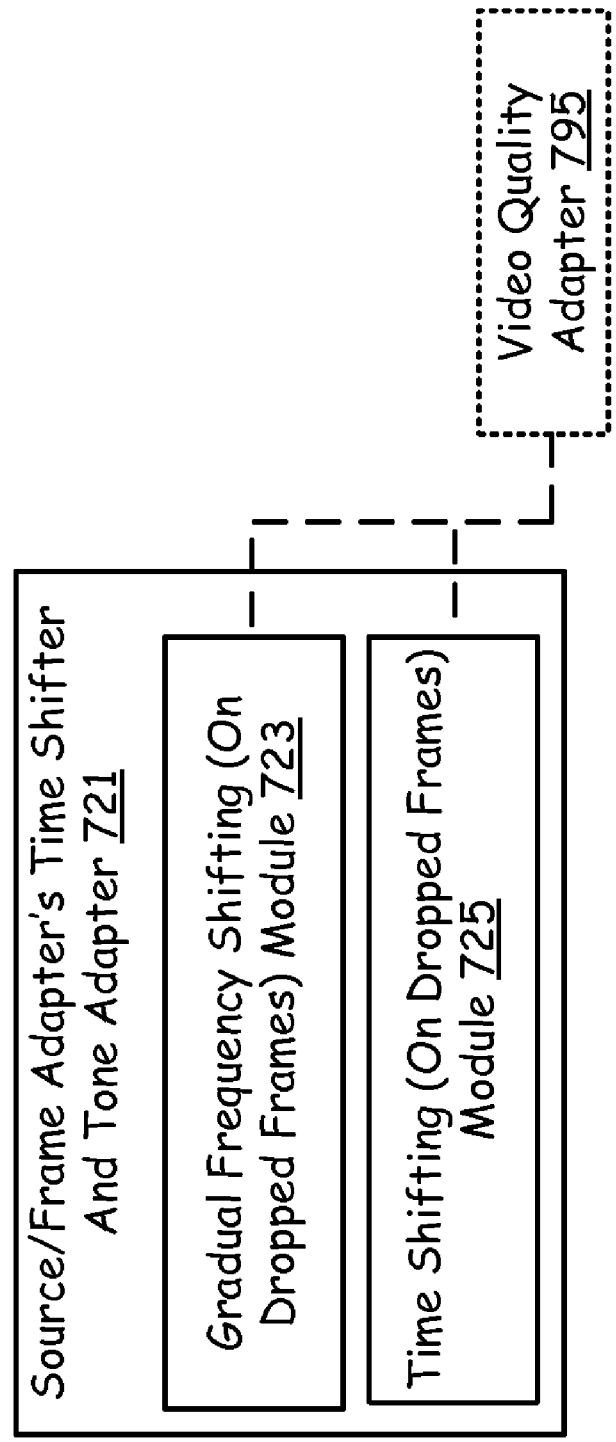
FIG. 7 is a schematic block diagram illustrating components of a source or frame adapter's time shifter/tone adapter circuitry constructed in accordance with the embodiments of FIG. 1, FIG. 3 and/or FIG. 4 of the present invention.

FIG. 7 is a schematic block diagram illustrating components of the source or frame adapter's time shifter/tone adapter circuitry 721 constructed in accordance with the embodiments of FIG. 1, FIG. 3 and FIG. 4 of the present invention. The source or frame adapter's time shifter/tone adapter circuitry 721 consists of a plurality of modules to perform time shifting and tone adapting of incoming digital audio program signals, including time shifting module 725 and gradual frequency shifting module 723. These modules receive input digital video and audio program signals from video quality adapter 795, in addition also receive information about first and last of the frames dropped (i.e., every time frames are dropped) during video quality adaptations. The modifications and applications of compensative sound effects performed by the source or frame adapter's time shifter/tone adapter circuitry 721 include elimination of digital audio program signals that correspond to the dropped frames (i.e., duration of frames in between first and last of the dropped frames), reassembly of remaining digital audio program signals, resynchronization and gradual shifts in frequency set (first upwards and then downwards, of the digital audio program signals, during the periods when frames are dropped) to compensate for the adaptive reductions in frame rate, performed by the video quality adapter 795.

The time shifting module 725 initially performs operation of time shifting the digital audio program signals, by eliminating the digital audio program signals that correspond to dropped frames during the adaptive reductions in frame rate and then, reassembling the rest of the digital audio program signals. Then, the time shifting module 725 resynchronizes the remaining digital audio program signals with that of digital video program signals, for which adaptive reductions in frame rate are already performed by the video quality adapter 795.

Once the time shifting operation is completed, the gradual frequency shifting module 723, applies compensative sound effects, which removes stutter and any other abrupt changes in the sound, period of which corresponds to that of dropped video frames. Initially, this operation involves identifying the first and last frames of the dropped frames, in any frame set interval, for each of the dropped sets. Then, the gradual frequency shifting module 723 gradually shifts frequency upwards and then downwards in such a way as to not have any discernable unwanted effects in audio reproductions. The gradual upward frequency shift is performed during a period of few frames, starting at few frames before first dropped frame and ending at the first dropped frame. Similarly, the gradual downward frequency shift is performed for a time period starting at last dropped frame and ending at few frames after the last dropped frame. The gradual frequency shift itself consists of shifting entire frequency set in upward or downward directions, during the above mentioned periods. Once, these operations upon the digital audio program signals are performed, the gradual frequency shifting module 723 delivers these digital video and audio program signals back to the video quality adapter 795.

Figure 8:
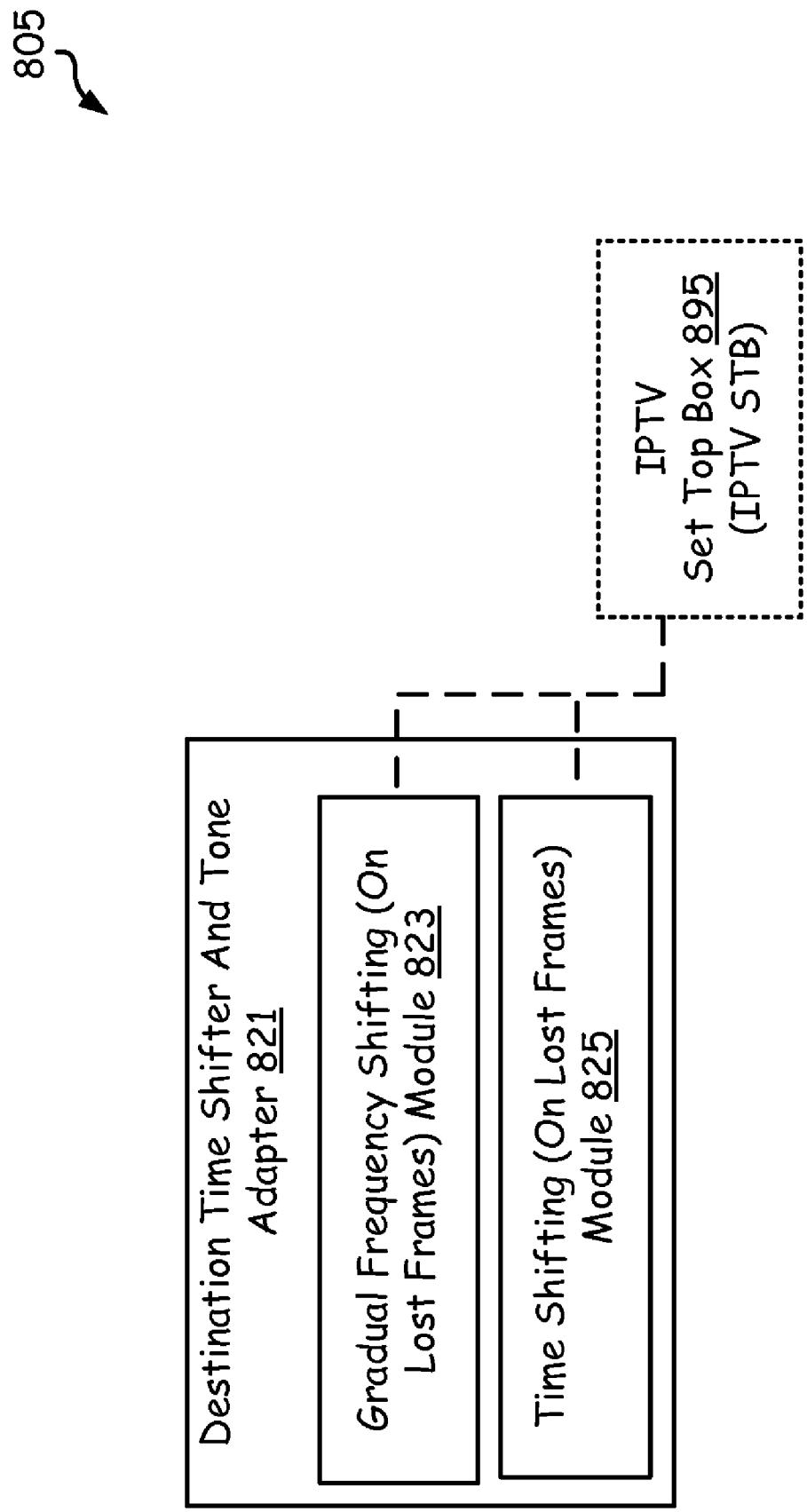
FIG. 8 is a schematic block diagram illustrating components of a destination time shifter/tone adapter circuitry constructed in accordance with the embodiments of FIG. 2, FIG. 3 and/or FIG. 4 of the present invention.

FIG. 8 is a schematic block diagram illustrating components of the destination time shifter/tone adapter circuitry 821 constructed in accordance with the embodiments of FIG. 2, FIG. 3 and FIG. 4 of the present invention. The destination time shifter/tone adapter circuitry 821 consists of modules such as time shifting module 825 and gradual frequency shifting module 823 to perform time shift and tone adaptation of incoming digital audio program signals from set top box 895. These modules also receive digital video program signals, and information about first and last of the frames dropped (i.e., every time frames are dropped) during video quality adaptations or first and last of the frames lost during transmission, from the set top box 895.

In effect the destination time shifter/tone adapter circuitry 821 eliminates digital audio program signals that correspond to the dropped or lost frames (i.e., duration of frames in between first and last of the dropped or lost frames), reassembles remaining digital audio program signals, resynchronizes with the digital video program signals, then gradually shifts in frequency set, first upwards and then downwards during the periods when frames are dropped or lost.

The time shifting module 825 initially eliminates the digital audio program signals that correspond to dropped or lost frames (during the adaptive reductions in frame rate or transmission) and reassembles the rest of the digital audio program signals. Then, the time shifting module 825 resynchronizes the remaining digital audio program signals with that of digital video program signals.

The gradual frequency shifting module 823, then, identifies the first and last frames of the dropped or lost frames and gradually shifts frequency upwards and then downwards, in the interval of few frames, starting at few frames before first dropped or lost frame and ending at few frames after the last dropped or lost frame, in such a way as to not have any discernable unwanted effects in audio reproductions. The gradual upward frequency shift is performed during a period of few frames, starting at few frames before first dropped or lost frame and ending at the first dropped or lost frame, and the gradual downward frequency shift is performed for a time period starting at last dropped or lost frame and ending at few frames after the last dropped or lost frame. The gradual frequency shift itself consists of shifting entire frequency set in upward or downward directions, during the above mentioned periods. Once, these operations upon the digital audio program signals are performed, the gradual frequency shifting module 823 delivers these digital video and audio program signals back to the set top box 895.

Figure 9:
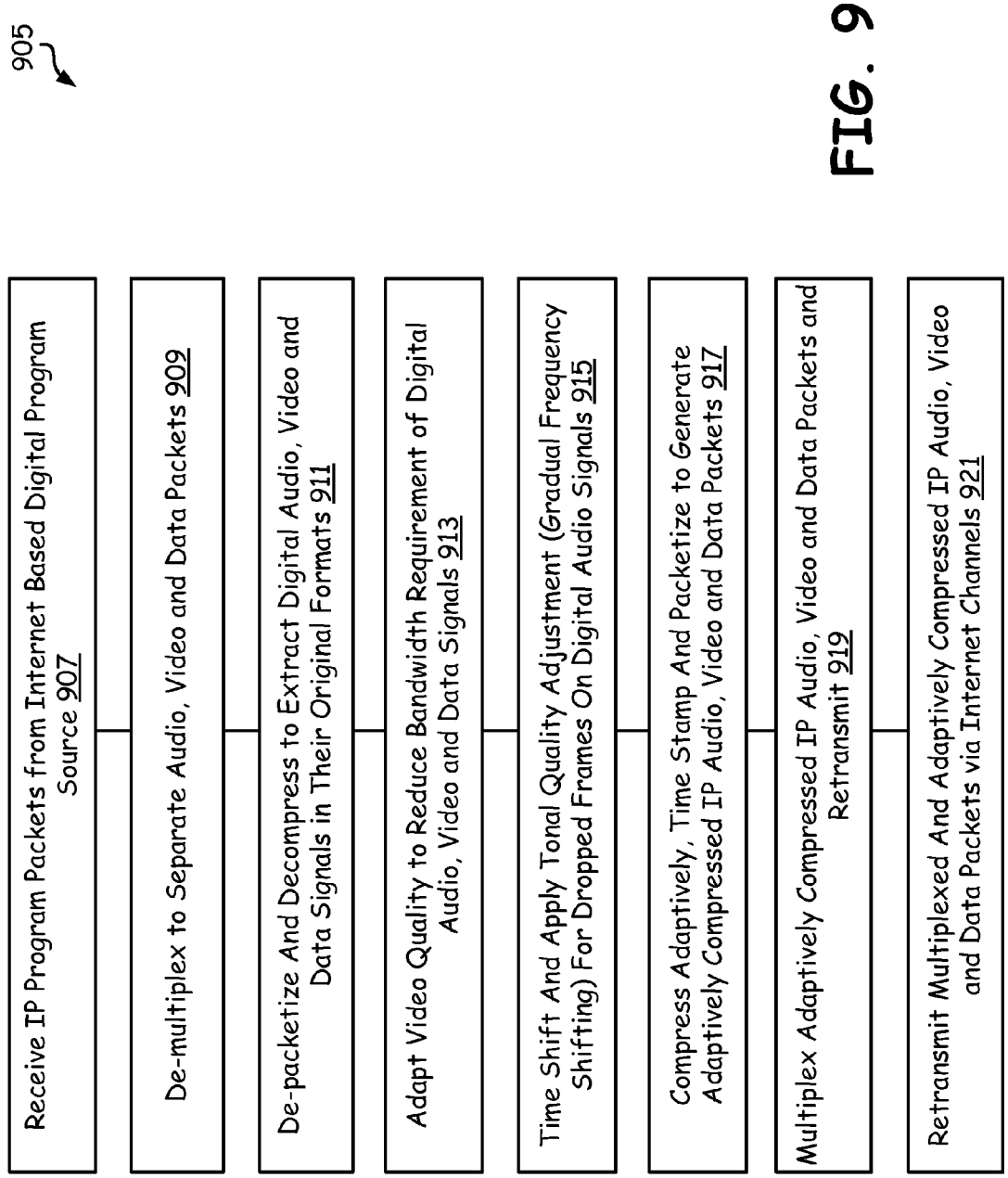
FIG. 9 is a flow diagram illustrating functionality of a frame adapter containing video quality adapter and frame adapter's time shifter/tone adapter, of FIG. 1 and/or FIG. 3.

FIG. 9 is a flow diagram illustrating functionality of the frame adapter (containing video quality adapter and frame adapter's time shifter/tone adapter), of FIG. 1 and FIG. 3. The functionality begins at a block 907, when the frame adapter receives IP program packets from an Internet based digital program source. The Internet based digital program source may be any of the Internet Service Provider's (ISP's) equipments or may process and re-route programs originated by other program sources.

At a next block 909, the frame adapter de-multiplexes incoming IP program packets to separate audio, video and data packets. Then, at a next block 911, the frame adapter de-packetizes the separated audio, video and data packets to remove internet protocol information and extracts compressed digital audio, video and data contents. Then, the frame adapter decompresses the compressed digital audio, video and data contents to extract digital audio, video and data program signals.

At a next block 913, the frame adapter adapts video quality to reduce bandwidth requirements of the Internet as well as to reduce processing and buffering requirements at the recipient device. The video quality adaptation involves varying frame rate, pixel and color resolutions, based upon minimum number of frames per second and minimum pixel and color resolutions required, for a set of frames, for not having a discernable difference in picture quality) and feedback control data.

At a next block 915, the frame adapter time shifts and applies tone adaptation on digital audio program signals. This is done by initially eliminating digital audio program signals that correspond to dropped frames during the adaptive reductions in frame rate, reassembling the rest of the digital audio program signals and re-synchronizing the remaining digital audio program signals with that of digital video program signals. Once the time shifting operation is completed, the frame adapter gradually shifts frequency upwards and then downwards in such a way as to not have any discernable unwanted effects in audio reproductions. The gradual upward frequency shift is performed during a period of few frames, starting at few frames before first dropped frame and ending at the first dropped frame. Similarly, the gradual downward frequency shift is performed for a time period starting at last dropped frame and ending at few frames after the last dropped frame. The gradual frequency shift itself consists of shifting entire frequency set in upward or downward directions, during the above mentioned periods.

Then, at a next block 917, the frame adapter adaptively compresses the digital audio, video and data signals in their original formats to generate adaptively compressed digital audio, video and data signals. Then, the frame adapter inserts time stamps and packetizes the resulting signals. Then, at a next block 919, the frame adapter multiplexes adaptively compressed IP audio, video and data packets. At a final block 921, the frame adapter retransmits these IP program packets to the recipient device via the Internet.

Figure 10:
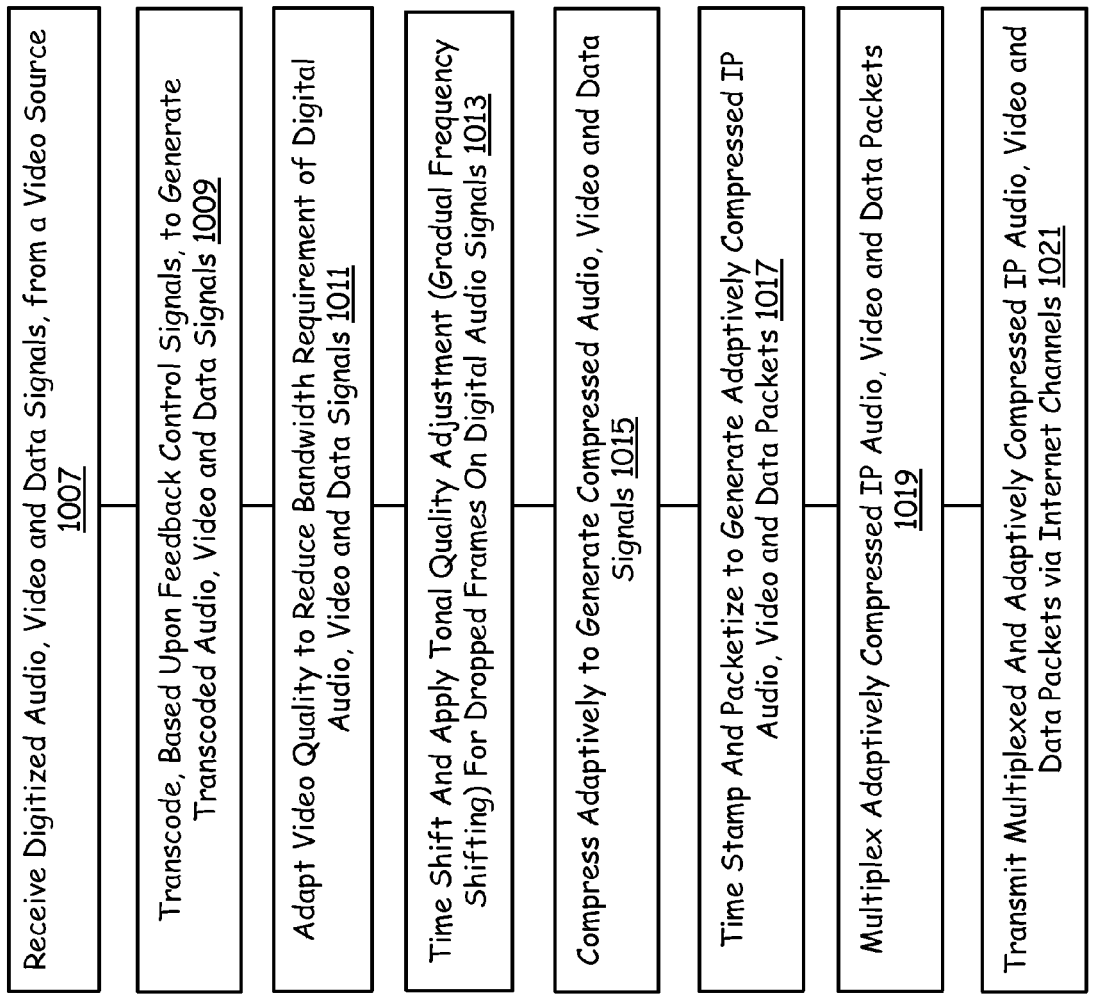
FIG. 10 is a flow diagram illustrating functionality of an adaptive encoder and multiplexer containing video quality adapter and source time shifter/tone adapter of FIG. 4.

FIG. 10 is a flow diagram illustrating functionality of the adaptive encoder and multiplexer (containing video quality adapter and source time shifter/tone adapter) of FIG. 4. The functionality begins at a block 1007, when the adaptive encoder and multiplexer receives digital program signals directly from a local video source or external source. Then, at a next block 1009, the adaptive encoder and multiplexer adaptively transcodes the digital audio, video and data signals to generate adaptively transcoded digital audio, video and data signals, based upon control signal parameters from a feedback control unit built into the adaptive encoder and multiplexer containing video quality adapter.

At a next block 1011, the adaptive encoder and multiplexer adapts video quality by varying frame rate, pixel and color resolutions in accordance with a frame set backdrop (a quantitative representation of minimum number of frames per second and minimum pixel and color resolutions required, for a set of frames, for not having a discernable difference in picture quality) and feedback control data (which is received from the recipient device via a feedback control unit built into the frame adapter containing video quality adapter).

At a next block 1013, the adaptive encoder and multiplexer time shifts and applies tone adaptation on the digital audio program signals. Time shifting involves eliminating digital audio program signals that correspond to dropped frames during the adaptive reductions in frame rate, reassembling the rest of the digital audio program signals and then, re-synchronizing the remaining digital audio program signals with that of digital video program signals. The tone adaptation involves gradual shifting of frequency upwards and then downwards, in the interval of few frames, starting at few frames before first dropped frame and ending at few frames after the last dropped frame, in such a way as to not have any discernable unwanted effects in audio reproductions. The gradual upward frequency shift is performed during a period of few frames, starting at few frames before first dropped frame and ending at the first dropped frame, and the gradual downward frequency shift is performed for a time period starting at last dropped frame and ending at few frames after the last dropped frame. The gradual frequency shift itself consists of shifting entire frequency set in upward or downward directions, during the above mentioned periods.

Then, at a next block 1015, the adaptive encoder and multiplexer adaptively compresses the digital audio, video and data signals to generate adaptively compressed digital audio, video and data signals, based upon feedback control data obtained from the corresponding recipient device. At a next block 1017, the adaptive encoder and multiplexer inserts time stamps to enable the recipient device to sequentially re-assemble program packets. Then, the adaptive encoder and multiplexer packetizes the resulting time stamped audio, video and data signals, by inserting IP (the Internet Protocol) information that includes the recipient device internet address. Then, at a next block 1019, the adaptive encoder and multiplexer multiplexes adaptively compressed IP audio, video and data packets. At a final block 1021, the adaptive encoder and multiplexer retransmits these IP program packets to the recipient device via the Internet.

Figure 11:
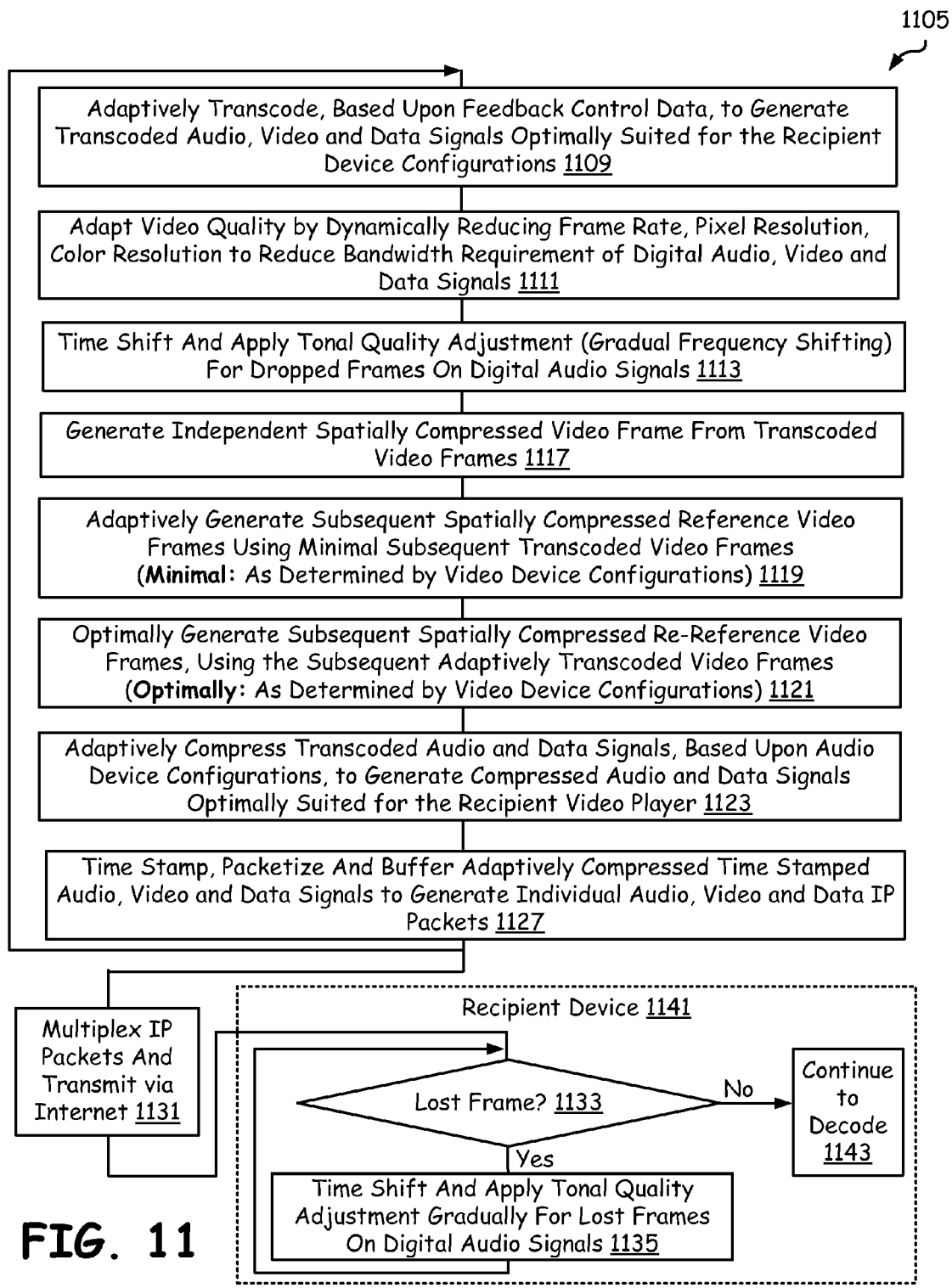
FIG. 11 is a flow diagram illustrating adaptive transcoding, video quality adaptation, source or frame adapter's time shifting/tone adaptation, adaptive encoding and/or destination time shifting/tone adaptation functionalities, partially or entirely employed by various devices in the embodiments of FIG. 1 through FIG. 4.

FIG. 11 is a flow diagram illustrating adaptive transcoding, video quality adaptation, source or frame adapter's time shifting/tone adaptation, adaptive encoding and/or destination time shifting/tone adaptation functionalities, partially or entirely employed by various devices in the embodiments of FIG. 1 through FIG. 4. The frame adapter/adaptive encoder and multiplexer flow cycle begins with adaptive transcoding, followed by video quality adaptation, audio time shifting and tone adaptation, and then encoding of video program signals, this flow repeats continuously until transmission is stopped and are illustrated by blocks 1109, 1111, 1113, 1117, 1119, 1121, 1123 and 1127.

The cycle of flow begins at the block 1109, when the frame adapter/adaptive encoder and multiplexer adaptively transcodes the digital audio, video and data signals to generate optimally suited audio, video and data signals, based upon recipient device configuration information obtained. The entire configuration data may include bandwidth required, mono, stereo and surround sound capabilities, aspect ratio and size, audio and video processing capabilities and buffering capabilities. Then, at the next block 1111, the frame adapter/adaptive encoder and multiplexer dynamically adapts video quality by reducing frame rate, pixel and color resolutions in response to a frame set backdrop and feedback control data.

At the next block 1113, the frame adapter/adaptive encoder and multiplexer time shifts and applies tone adaptation on digital audio program signals. Time shifting and tone adaptation involve eliminating digital audio program signals that correspond to dropped frames during the adaptive reductions in frame rate, reassembling the rest of the digital audio program signals and re-synchronizing the remaining digital audio program signals with that of digital video program signals, followed by gradual shifting of frequency upwards and then downwards, in the interval of few frames, starting at few frames before first dropped frame and ending at few frames after the last dropped frame (in such a way as to not have any discernable unwanted effects in audio reproductions). The gradual upward frequency shift is performed during a period of few frames, starting at few frames before first dropped frame and ending at the first dropped frame, and the gradual downward frequency shift is performed for a time period starting at last dropped frame and ending at few frames after the last dropped frame. The gradual frequency shift itself consists of shifting entire frequency set in upward or downward directions, during the above mentioned periods.

At the next block 1117, the frame adapter/adaptive encoder and multiplexer generates spatially compressed independent or base video frame, from the transcoded and quality adapted video frames. At the next block 1119, the frame adapter/adaptive encoder and multiplexer adaptively generates subsequent spatially compressed reference (predictive) video frames using minimal subsequent transcoded video frames. At the next block 1121, the frame adapter/adaptive encoder and multiplexer adaptively generates subsequent spatially compressed re-reference (bidirectional predictive) video frames using minimal subsequent transcoded video frames. At the next block 1123, the frame adapter/adaptive encoder and multiplexer generates adaptively compressed audio signals from the transcoded, time shifted and tone adapted audio signals, based upon audio configurations of the recipient device. Then, the frame adapter/adaptive encoder and multiplexer adaptively compresses data signals if necessary.

At the next block 1127, the frame adapter/adaptive encoder and multiplexer inserts time stamps separately to compressed audio, video and data signals. Then, the frame adapter/adaptive encoder and multiplexer packetizes the resulting time stamped audio, video and data signals, by inserting IP (the Internet Protocol) information that includes the recipient device internet address, and in addition, buffers some of the latest audio, video and data packets for resending lost packets at a later time.

Then, at a next block 1131, the frame adapter/adaptive encoder and multiplexer multiplexes adaptively transcoded, video quality adapted, time shifted and tone adapted and adaptively compressed IP program packets generated by the processes of blocks 1109, 1111, 1113, 1117, 1119, 1121, 1123 and 1127 and retransmits via the Internet.

At a next block 1141, functionality of a recipient device or set top box begins. At a next decision block 1133, the recipient device verifies if any frames are lost during transmission. If yes, at a next block 1135, the recipient device applies time shifting and tone adaptation on the audio signals that correspond to a short duration in the vicinity of lost frames. If not at the decision block 1133, then at the block 1143, the recipient device continues to decode and further process audio, video and data signals.

According to one or more of the embodiments of FIGS. 1-11, a digital electronic component operates upon a digital video stream and a corresponding digital audio stream. The digital electronic component includes a video quality adapter that adaptively reduces a frame rate of the digital video stream, a time shifter that resynchronizes the digital audio stream to the frame rate reduced digital video stream, and a tone adapter that gradually shifts a frequency of audio content of the digital audio stream to eliminate discontinuous audio characteristics of the digital audio stream produced by the time shifter during resynchronization of the digital audio stream.

The tone adapter may shift the frequency of audio content of the digital audio stream over time commensurate with the adaptive reductions in frame rate of the digital video stream. The digital electronic component may be operable to receive the digital video stream and the digital audio stream, decode the digital video stream and the digital audio stream, encode the digital video stream with the reduced frame rate, encode the resynchronized digital audio stream, and transmit the encoded digital video stream with the reduced frame rate and the encoded resynchronized shifted digital audio stream.

Adaptive reductions in frame rate may include reducing the frame rate over time based upon a minimum number of frames per second required to reduce a discernable difference in picture quality of the recipient device. The digital electronic component may be operable to eliminate digital audio stream data corresponding to dropped frames of the digital video stream commensurate with the adaptive reductions in frame rate. The digital electronic component may be operable to create reference frames based upon received digital video frames to replace missing reference frames of the digital video frame stream, and realign the digital audio stream with newly introduced reference clock signals.

The tone adapter may first gradually increases the frequency of the audio content and then gradually decreases the frequency of the audio content. With these operations, first gradually increasing the frequency of the audio content may include gradually shifting an entire frequency set of the audio content upwards beginning with audio content corresponding to video frames prior to a dropped video frame. Further, gradually decreasing the frequency of the audio content may include gradually shifting an entire frequency set of the audio content downwards beginning with audio content corresponding to a dropped video frame.

The digital electronic component may operate upon digital video program signals derived from a set top box and include a time shifter that resynchronizes digital audio program signals to compensate for adaptive reductions in frame rate or loss of video packets during transmission and a tone adapter that gradually shifts frequency the digital audio program signals, to eliminate discontinuous audio reproductions in recipient device, during adaptive reductions in frame rate or with loss of video packets during transmission. In its operations, the digital electronic component receives the digital video program signals from the set top box, the time shifter resynchronizes the digital audio program signals, to compensate for the adaptive reductions in frame rate or loss of video packets during transmission, the tone adapter gradually shifts frequency of the digital audio program signals, during the adaptive reductions in frame rate or with loss of video packets during transmission, and the digital electronic component delivers the adapted digital video program signals or digital video program packets with loss of frames in transmission, along with time shifted and tone adapted digital audio program signals, to the set top box for further processing.

With this structure/operation, the digital electronic component compensates for the adaptive reductions in frame rate by eliminating the digital audio program signals that correspond to dropped frames during the adaptive reductions in frame rate. Further, eliminating digital audio program signals may include re-synchronizing the remaining digital audio program signals with the digital video program signals, to compensate for the adaptive reductions in frame rate. Compensation for the adaptive reductions in frame rate may include eliminating the digital audio program signals that correspond to lost frames during transmission. Eliminating digital audio program signals may include re-synchronizing the remaining digital audio program signals with the digital video program signals, to compensate for the loss of video packets during transmission.

The tone adapter may gradually shift a frequency of the digital audio program signals by gradually shifting an entire frequency set upwards, starting with a few frames before a first dropped frame. The tone adapter may also gradually shift a frequency of the digital audio program signals in frequency by gradually shifting an entire frequency set downwards starting with a frame after the last dropped frame. The tone adapter may gradually shift a frequency of the digital audio signals by gradually shifting an entire frequency set upwards starting a few frames before the first lost frame, until the first lost frame. The tone adapter may gradually shift a frequency of the digital audio program by gradually shifting an entire frequency set downwards, starting after a last lost frame, until few frames after the last lost frame.

The digital electronic component may receive, along with the digital video program signals, additional control information regarding adaptive reductions in frame rate or loss of frames due to the loss of video packets during transmission, from the set top box.

The digital video component may operate as a stand alone unit or be incorporated into an Internet based digital program source. In its operations, the digital video component identifies first and last dropped frames in a video frame set, eliminates digital audio program signals that correspond to a plurality of video frames that are between the first and last of the dropped video frames, gradually shifts upward in frequency digital audio program signals that correspond to video frames neighboring the first of the dropped video frames, gradually shifts downward in frequency digital audio program signals that correspond to video frames neighboring the last of the dropped video frames, and delivers the resultant digital audio program signals, along with digital video program signals, for encoding.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip", as used herein, refers to an integrated circuit. Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A digital electronic component that operates upon a digital video stream and a corresponding digital audio stream, the digital electronic component comprising:
    a video quality adapter that adaptively reduces a frame rate of the digital video stream by dropping video frames;
    a time shifter that resynchronizes the digital audio stream to the frame rate reduced digital video stream; and
    a tone adapter that shifts a frequency of audio content of the digital audio stream to eliminate discontinuous audio characteristics of the digital audio stream produced by the time shifter during resynchronization of the digital audio stream by providing upward frequency shift of the audio content commencing a number of frames prior to a first dropped video frame and providing downward frequency shift of the audio content for a number of frames commencing at a last dropped video frame.

2. The digital electronic component of claim 1, wherein the tone adapter provides the frequency shifts of audio content of the digital audio stream over time commensurate with the adaptive reductions in frame rate of the digital video stream corresponding to the dropped video frames.

3. The digital electronic component of claim 1, wherein the digital electronic component is operable to:
    receive the digital video stream and the digital audio stream;
    decode the digital video stream and the digital audio stream;
    encode the digital video stream with the reduced frame rate;
    encode the resynchronized digital audio stream; and
    transmit the encoded digital video stream with the reduced frame rate and the encoded resynchronized shifted digital audio stream.

4. The digital electronic component of claim 1, wherein the adaptive reductions in frame rate include reducing the frame rate over time based upon a minimum number of frames per second required to reduce a difference in picture quality of a recipient device.

5. The digital electronic component of claim 1, wherein the digital electronic component is operable to eliminate digital audio stream data corresponding to the dropped video frames of the digital video stream commensurate with the adaptive reductions in frame rate.

6. The digital electronic component of claim 1, wherein the digital electronic component is operable to:
    create reference frames based upon received digital video frames to replace missing reference frames of the digital video frame stream; and
    realign the digital audio stream with newly introduced reference clock signals.

7. The digital electronic component of claim 1, wherein when providing upward frequency shift of the audio content, the upward frequency shift ends at the first dropped video frame.

8. A digital electronic component that operates upon digital audio and video program signals received from a set top box, the digital electronic component comprising:

a time shifter that resynchronizes digital audio program signals with digital video program signals that have been frame rate reduced by dropping video frames; and a tone adapter that shifts a frequency of the digital audio program signals to eliminate discontinuous audio reproductions during reductions in the frame rate of the digital video program signals by providing upward frequency shift of the audio content commencing a number of frames prior to a first dropped video frame and providing downward frequency shift of the audio content for a number of frames commencing at a last dropped video frame.

9. The digital electronic component of claim 8, wherein the time shifter is operable to compensate for adaptive reductions in frame rate by eliminating components of the digital audio program signals that correspond to dropped video frames of the digital video program.

10. The digital electronic component of claim 9, wherein eliminating components of the digital audio program signals comprises re-synchronizing remaining digital audio program signals with digital video program signals to compensate for adaptive reductions in frame rate of the digital video program signals.

11. The digital electronic component of claim 10, further comprising a video quality adapter that performs adaptive reductions in frame rate over time to reduce a difference in picture quality of a recipient device.

12. The digital electronic component of claim 11, wherein the time shifter is further operable to eliminate digital audio program signals to compensate for a loss of video packets during transmission.

13. The digital electronic component of claim 8, wherein when providing upward frequency shift of the audio content, the upward frequency shift ends at the first dropped video frame.

14. The digital electronic component of claim 8, wherein the digital electronic component is operable to:

create reference frames based upon received digital video frames to replace missing reference frames of the digital video frame stream; and realign the digital audio stream with newly introduced reference clock signals.

15. The digital electronic component of claim 8, wherein the digital electronic component is operable to receive, along with the digital video program signals, additional control information regarding adaptive reductions in frame rate or loss of frames due to the loss of video packets during transmission from the set top box.

16. A method for operating on received digital audio and video program signals comprising:

identifying first and last dropped frames in a video frame set having dropped video frames;

eliminating digital audio program signals that correspond to a plurality of video frames that correspond to the dropped video frames;

providing upward frequency shift of the digital audio program signals commencing a number of frames prior to a first dropped video frame;

providing downward frequency shift of the digital audio program signals for a number of frames commencing at a last dropped video frame; and delivering the resultant digital audio program signals, along with digital video program signals, for encoding.

17. The method of claim 16, wherein the upward frequency shift is performed for an entire frequency set.

18. The method of claim 16, wherein the downward frequency shift is performed for an entire frequency set.

19. The method of claim 16, further including varying a frame rate of the video signal based on a recipient device.

20. The method of claim 16, further including varying a pixel and color resolution of the video signal based on a recipient device.

* * * * *